Dec. 19, 1967   H. W. ALTER ETAL   3,359,078
IRRADIATED NUCLEAR FUEL RECOVERY
Filed Feb. 10, 1965   2 Sheets-Sheet 1
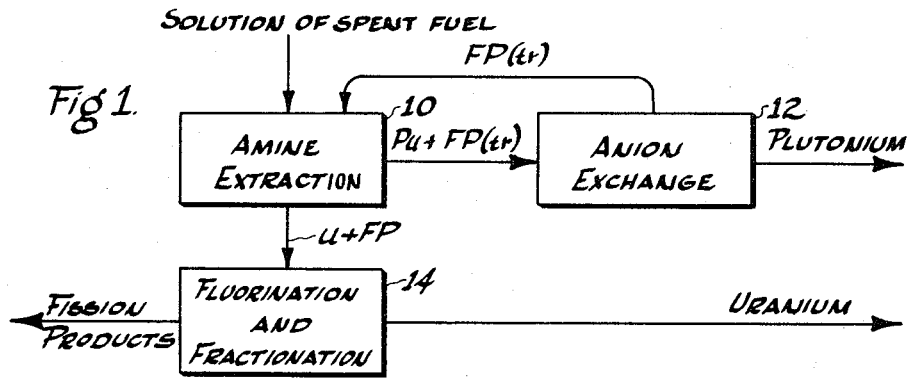
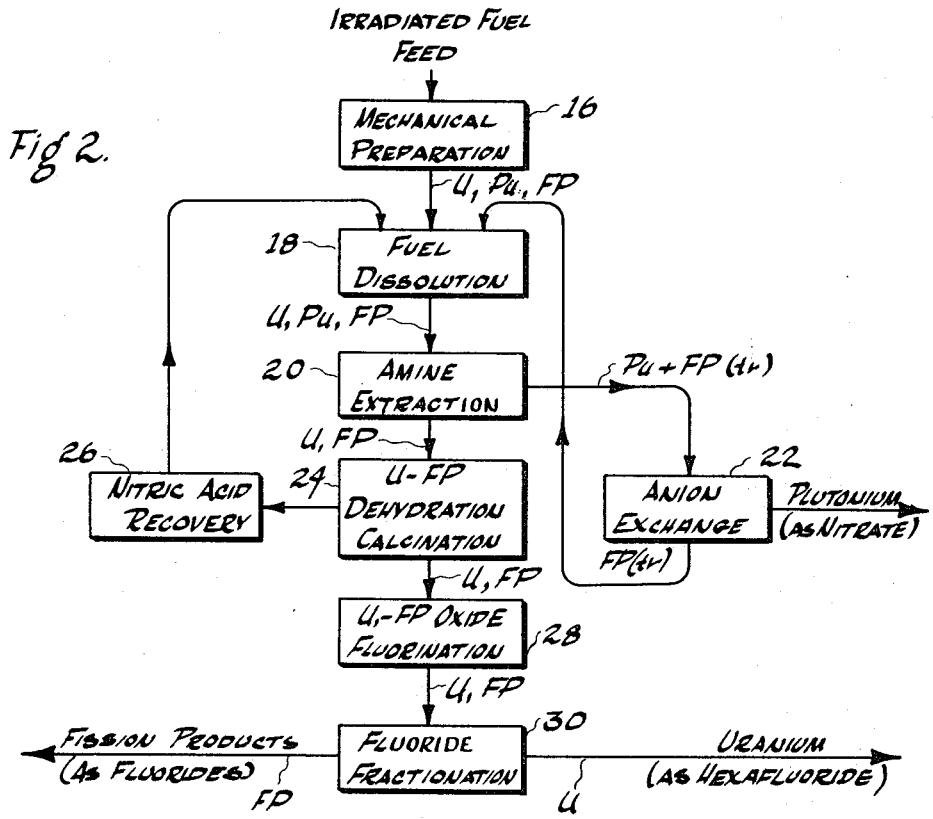
INVENTORS
HENRY WARD ALTER
CLEVE R. ANDERSON
BY
ATTY

INVENTORS.
HENRY WARD ALTER
CLEVE R. ANDERSON

United States Patent Office 3,359,078
Patented Dec. 19, 1967

3,359,078
IRRADIATED NUCLEAR FUEL RECOVERY
Henry Ward Alter, Danville, and Cleve R. Anderson, Portola Valley, Calif., assignors to General Electric Company, a corporation of New York
Filed Feb. 10, 1965, Ser. No. 431,684
11 Claims. (Cl. 23—326)

This invention relates to the chemical processing of irradiated material removed from a nuclear chain fission reactor, and relates more particularly to an improved method for chemical processing of highly radioactive plutonium-containing uranium power reactor fuel, which method is characterized by its achievement of high decontamination efficiency with a substantially reduced number of processing steps and a substantial reduction in the volume of radioactive waste materials relative to conventional methods.

Nuclear chain fission reactions and the reactors in which such reactions are accomplished are now well known. In general, a nuclear reactor is made up of a chain reacting assembly including nuclear fuel contained in fuel elements having various geometric shapes such as plates, tubes, or rods. These fuel elements are usually provided with a corrosion resistant non-reactive heat conductive layer or clad on their external surfaces. In power reactors, these elements are usually grouped together at fixed distances from one another in a coolant flow channel or region forming what is termed a fuel assembly. A sufficiently large number of such assemblies are combined together in the chain reacting assembly or core to permit a self-sustained nuclear fission chain reaction. The reactor core is enclosed within a container through which the reactor coolant is circulated. In thermal neutron reactors, a neutron moderator is also provided, and in some cases this moderator may also perform as the reactor coolant. The known boiling water and pressurized water reactors are examples of such thermal reactors.

The nuclear fuel material contains fissionable atoms such as U-233, U-235, Pu-239, or Pu-241. This material may be in elemental or compound form. Upon absorption of a neutron by the nucleus by such a fissionable atom, a nuclear disintegration frequently results. This produces on the average two fission product atoms of lower atomic weight and of great kinetic energy. Also released in such a disintegration are several neutrons of high energy. For example, in the fission of U-235, a light fission product of mass number ranging between 80 and 110 and a heavy fission product of mass number ranging between 125 and 155 are produced. On the average, 2.5 neutrons per fission event are released. The total energy released approaches 200 mev. (million electron volts) per fission.

The kinetic energy of the fission products as well as that of the fission neutrons is quickly dissipated, producing heat in the fuel elements of the reactor. Some additional heat is generated directly in the reactor structural materials, in the coolant, and in the moderator due to radiation effects. If there is one net neutron remaining on the average from each fission event and this neutron induces a subsequent fission event, the fission reaction becomes self-sustaining and is thus called a chain reaction. Heat generation may be maintained and the heat is removed by passing a coolant fluid through heat exchange relationship with the fuel elements. The fissionable atoms are thus gradually consumed. Some of the fission products produced are strong neutron absorbers (fission product poisons). Thus the fission reaction tends to decrease and cannot be maintained indefinitely at a given level.

In some nuclear reactor fuel elements, fertile materials such as U-238 may be included in addition to the above noted fissionable atoms. A fairly common currently used nuclear power reactor fuel consists for example of uranium dioxide ($UO_2$) in which approximately 2.0% of the uranium atoms present are isotope U-235 which is fissionable in a thermal neutron flux, while the remaining 98% are the fertile isotope U-238 which is not so fissionable to any significant degree. In the course of operating a reactor fueled with such fissionable and fertile atoms, the fissionable atoms (U-235) originally present are gradually consumed and simultaneously neutron irradiation of the fertile atoms (U-238) converts a part of them ultimately into a fissionable isotope (Pu-239). The concentration of the Pu-239 gradually rises with irradiation and approaches an equilibrium value. The Pu-239 atoms are fissionable by thermal neutrons and thus contribute to the maintenance of the chain fission reaction so that the reaction may be continued longer than would have been the case if only the original charge of fissionable atoms were available.

Since the quantity of fissionable material created by fertile atom conversion is always (except in the breeder-converter type of reactor of special design) less than the rate at which the original fissionable atom charge is consumed during operation, the reactor can maintain this heat generation at a given power level for only a finite length of time. Ultimately the maximum power level at which the reactor can be operated must be decreased and finally the reactor must be shut down for refueling. Some or all of the spent or irradiated fuel assemblies are removed and replaced with new fuel having a higher concentration of fissionable atoms and no fission product poisons. The reactivity of the refueled reactor core is higher and the original power level can thus be restored.

The irradiated reactor fuel removed from the reactor ordinarily contains a valuable quantity of the original fissionable material. It will contain also a significant quantity of fissionable material (such as Pu-239) converted from any fertile component (such as U-238) of the original fuel. Irradiated fuel also may contain fission product or transuranic isotopes (or both) which are of substantial value. Accordingly, it is highly desirable to process the fuel material to recover and separate these materials for reuse. Such reuse of uranium and plutonium as a practical matter requies a high degree of fission product removal to reduce radioactivity and permit direct handling. Fission product separation or "decontamination" sufficient to reduce the product radioactivity to on the order of $10^{-7}$ to $10^{-8}$ of its original value is required. Such reductions are said to involve "decontamination factors" of $10^7$ or $10^8$, respectively.

One currently utilized irradiated fuel processing system has been termed the purex process. This process is currently in use in the chemical processing of plutonium production reactor fuel. The purex process utilizes an organic solvent consisting of tributyl phosphate diluted with kerosene to extract the uranium and plutonium selectively from a nitric acid solution of irradiated fuel. The process uses nitric acid as a "salting agent" in that moderate concentrations cause the uranium and plutonium to extract into the organic solvent while lower concentrations permit these materials to return to the aqueous phase. The purex process uses three separate cycles of such extraction on the uranium and the plutonium, each cycle consisting of a transfer of the uranium or the plutonium, or both, from the aqueous phase into the organic phase and back into an aqueous phase.

In the first or co-decontamination cycle, the uranium and plutonium values are extracted along with a trace of the fission products into the organic phase and are subsequently stripped into an aqueous phase. In the second or partitioning cycle, the aqueous uranium-plutonium product from the co-decontamination cycle is again contacted with tributyl phosphate and kerosene to extract both materials. The plutonium is then separated from the uranium by reducing the plutonium to a lower valence state by means of a chemical reducing agent in scrubbing the organic phase with an aqueous acid of moderate concentration to produce an aqueous plutonium-containing stream. The uranium is subsequently stripped from the organic extract into a dilute acidic aqueous phase. Both the aqueous plutonium and uranium streams from the partitioning cycle are further purified in separate final third cycle solvent extractions. The plutonium in the aqueous plutonium stream is first oxidized back to its previous valence state to favor extraction into the organic solvent from which it is stripped by means of a dilute acid scrubbing agent. The plutonium product stream is finally purified by accumulation on and elution from an anion exchange resin bed. The uranium in the aqueous uranium stream is extracted by and recovered from a third tributyl phosphate in kerosene solvent stream. The uranium product stream is finally purified by a solid adsorption treatment, such as with silica gel, to remove residual traces of fission products.

There are a number of significant disadvantages in the purex process for irradiated fuel processing. There is a substantial amount of duplicate equipment in view of the fact that three complete solvent extraction cycles are required to produce sufficiently decontaminated plutonium and uranium products. There is produced a large volume of radioactive waste materials, approximating 1500 gallons per ton of uranium in the fuel processed. This is due to the fact that the organic solvent is treated with various chemical reagents to remove degradation products before it is recycled. This organic solvent degradation becomes quite rapid in the radiation field created by the fission products and it adversely affects processing capabilities. The degradation problem is aggravated in the reprocessing of the much more highly radio-active power reactor fuels which have been irradiated to exposure levels of about 15,000 megawatt days per ton (mwd./t.) or more. Large quantities of heat are consumed in liquid evaporation which is required in the concentration of streams between the several solvent extraction cycles. This requires extensive capital equipment, particularly heat exchangers. The difficulties of remote operation and maintenance and of corrosion in this equipment are well known.

Another solvent extraction method for irradiated fuel processing is termed the redox process. It utilizes a non-volatile salting agent and a volatile solvent, in contrast to the non-volatile solvent (tributyl phosphate in kerosene) and the volatile salting agent (nitric acid) utilized in the purex process. In the redox process a nitric acid solution of spent fuel is extracted with methylisobutyl ketone (hexone) as the organic solvent. The hexone extracts the plutonium and uranium values leaving an aqueous solution of the fission product wastes. An aqueous solution of aluminum nitrate is used as the salting agent. Plutonium values are separated from the organic phase into an aqueous phase in the manner similar to the purex process. The uranium value is extracted or "salted" from the organic phase by means of dilute nitric acid. Both the uranium and plutonium streams so produced are subjected to second cycles of solvent extraction.

Although the solvent recovery in the redox process is simplified by its volatile nature, substantial volumes of waste are created in the form of solutions of the salting agent which is not recovered for reuse. The equipment is complex since the desired plutonium and uranium product decontamination factors are only achieved through three solvent extraction cycles and final product cleanup through ion exchange and solid adsorption. An undesirable degree of solvent degradation also occurs in the redox process, but the problem is reduced to some extent since the solvent may be fairly readily purified by evaporation processes.

Several other processes for irradiated fuel processing have been proposed. One of these is termed melt refining. This process is limited to the treatment of metallic fuels. It includes the steps of melting the fuel in a crucible fabricated from a refractory oxide such as zirconia ($ZrO_2$), and holding the melt at a temperature of 1300° C. to 1400° C. for 3 to 5 hours. Volatile fission products (xenon, krypton, and cesium) are boiled off. The very reactive fission products such as the rare earths, barium and strontium, are removed in a reaction layer that forms along the crucible walls. The noble fission products such as ruthenium, rhodium, palladium, and molybdenum are not removed and their concentrations build up to equilibrium values which depend upon the percentage of fresh material added on refabrication of the fuel to replace that consumed in the reactor and lost in reprocessing. Although this process is simple, high decontamination factors are not realized and the uranium recovered is radioactive and must be refabricated in shielded facilities using remotely operated equipment. Further, the recovery efficiencies are very much lower than those experienced with the redox and purex processes.

Another process is termed the fused-salt process which utilizes molten salts as reaction media. In this process, which is suitable to the treatment of uranium oxide fuels, chlorine or hydrogen chloride is used to chlorinate uranium oxide in an equimolar melt of sodium chloride and potassium chloride. The temperatures used are 750° to 800° C. The uranium oxide is deposited at a cathode in an electrolytic treatment of the molten material. This process suffers from the disadvantages of low decontamination factors, low recovery efficiency, large volumes of salt wastes, and the need for separate plutonium recovery steps.

Another process which has been proposed for the treatment of irradiated fuel involves direct fluorination. This process is based on the conversion of the uranium and plutonium values available in irradiated fuel to the corresponding fluorides by direct reaction with fluorine gas followed by fractionation of the volatile uranium and plutonium fluorides. This process is currently in the developmental stage and is yet to be demonstrated in a practical application. Some of its yet unsolved difficulties include the decomposition of the plutonium hexafluoride, and reaction efficiencies of fluorine with the uranium and plutonium in the presence of other elements in the fuel such as molybdenum or iron.

The present invention is directed to a combination process for the chemical processing of irradiated nuclear reactor fuels in which all of the above-mentioned problems and disadvantages are overcome. The present invention is particularly directed to a fuel processing operation which is simplified through reduction in the number of required processing steps, in which the two principal steps of the process cooperate actively with one another to achieve a remarkably efficient decontamination, and in which a substantial reduction in the quantity of radioactive waste materials which must be stored has been realized.

It is therefore a primary object of the present invention to provide a simplified chemical processing procedure for the recovery of plutonium and uranium values at high decontamination factors in a minimum number of processing steps.

Another object of this invention is to eliminate substantially completely the production of large volumes of liquid high activity waste materials which otherwise must be retained in expensive underground storage facilities.

Other objects and advantages of this invention will become apparent to those skilled in this art as the description and illustration thereof proceeds.

Briefly, one aspect of the present invention comprises the steps of contacting an aqueous solution of irradiated nuclear fuel with an organic solvent comprising a tertiary or quaternary organic amine salt and an inert organic diluent, to separate the plutonium values from the uranium values and the fission products, fluorination of the substantially plutonium-free uranium and fission products, and fractionation of the volatile fluorides resulting to separate the uranium from the fission products. It has now been found that the organic amine extraction step for plutonium removal from irradiated fuel solutions cooperates with the uranium-fission product fluorination and fractionation steps according to this invention and permits substantial reduction and simplification of capital equipment requirements relative to the conventional irradiated fuel processes noted above. Simultaneously the uranium product is delivered as the volatile hexafluoride and is amenable to direct reintroduction into the uranium enrichment facilities.

In somewhat greater detail, one aspect of the present invention comprises the dissolving of irradiated reactor fuel in a strong mineral acid such as nitric acid, the contacting of the solution of irradiated fuel with an organic solvent containing a tertiary or quaternary organic amine nitrate in an inert organic diluent to produce a substantially plutonium-free aqueous raffinate stream containing the uranium and substantially all of the fission product values, recovering the plutonium as an aqueous extract from the rich organic solvent, contacting the aqueous plutonium extract with an anion exchange resin to separate the plutonium from the remaining fission products, recovering the plutonium from the ion exchange resin as a decontaminated plutonium product solution, dehydrating and calcining of the aqueous uranium-fission product raffinate stream, fluorinating the anhydrous product of the dehydration-calcination step, and separating the relatively low boiling uranium hexafluoride by fractionation of the mixed uranium and fission product fluorides, the latter two steps being conducted in the absence of plutonium fluorides.

In the operation of the prior art multi-cycle solvent extraction processes discussed above, an upset in processing conditions may produce uranium and plutonium product streams with markedly increased quantities of radioactivity due to the fission products passing from one cycle to the next. This can increase the radioactive content of the next cycle by factors of from 10 to 1000, depending on the magnitude of the process upset. Several days may be required to work out of this situation. The degree of separation required of about one hundred million to one between the uranium and plutonium on the one hand and the fission products on the other leaves little flexibility in multi-cycle solvent extraction processes for radioactivity carryover from one cycle to the next.

With the present invention, however, the organic amine extraction step performs a substantially complete separation of plutonium from the uranium and the fission products. The combined process performs efficiently even though substantially all of the fission products appear in the uranium stream since in the fluorination-fractionation step of the process a high degree of separation of these fission products from the uranium is readily accomplished in the fractionation of the respective fluorides. The fluoride fractionation step is made feasible by the preliminary removal of substantially all the plutonium. It has been found that the separation of mixed uranium-plutonium fluorides is extremely difficult due to plutonium fluoride decomposition reactions, a problem avoided completely in this invention. Decontamination factors on the order of $10^8$ are realized in the process of this invention with relatively uncomplicated equipment. The process of this invention therefore is capable of treating very highly irradiated plutonium-containing uranium fuel discharged from power reactors and separating by means of considerably simplified equipment thoroughly decontaminated uranium and plutonium products which meet current industry specifications for maximum radioactivity levels.

The present invention will be more readily understood by reference to the following detailed description which includes references to the accompanying drawings in which:

FIGURE 1 is a simplified block diagram illustrating the basic principles of the process of the present invention;

FIGURE 2 is a somewhat more elaborate block diagram illustrating the key steps of the process in this invention.

Figure 3:
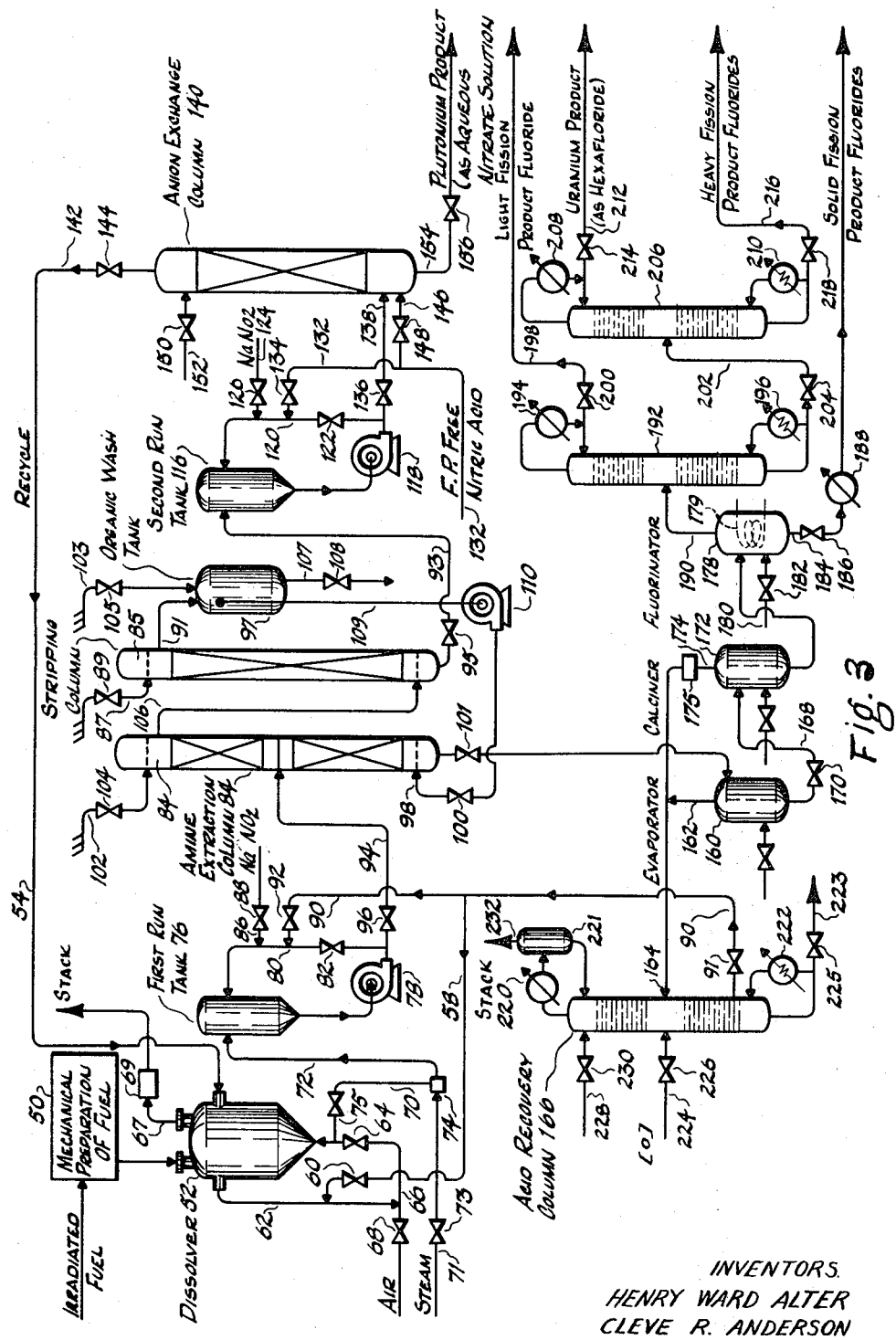
FIGURE 3 is a schematic flow diagram of one embodiment of the invention.

Referring now particularly to FIGURE 1, a simplified block diagram of the process of this invention is shown. The process is seen to consist of two major parts. The first part consists of steps carried out in the presence of an aqueous phase (blocks 10 and 12) and the second part consists of steps carried out under anhydrous conditions (block 14). An aqueous solution of the irradiated reactor fuel is introduced as feed to an organic amine extraction step or cycle represented by block 10. From this step of the process, the uranium and substantially all (99.9%) of the fission products are produced as an aqueous raffinate solution. The plutonium is produced as rich organic solvent, from which the plutonium, including the remaining traces (0.1%) of the fission product values, is recovered as an aqueous extract. The plutonium-containing aqueous extract solution is subjected to an anion exchange cycle represented by block 12 in which the plutonium and remaining traces of fission product values are separated from one another. The plutonium-free uranium-fission product raffinate solution is evaporated and calcined to produce anhydrous solids. The anhydrous plutonium-free material is introduced into the second or anhydrous part of the process represented by block 14 in which the material is fluorinated to produce the corresponding fluorides. The mixture of fluorides is then fractionated to separate volatile uranium and fission product fluorides in the absence of plutonium. For example, at a pressure of about 20 p.s.i.g., uranium hexafluoride boils at about 56° C. and is readily separable by fractional distillation from the fission product fluorides, most of which boil more than 100° C. higher than uranium hexafluoride. The absence of plutonium fluorides markedly facilitates the fractionation of the uranium and fission product fluorides.

Referring now more particularly to FIGURE 2, a more elaborate block diagram illustrating the process of this invention is given. Blocks 16, 18, 20, 22, 24, and 26 illustrated in FIGURE 2 represent steps carried out in the presence of an aqueous phase and thus are included in blocks 10 and 12 of FIGURE 1. Blocks 28 and 30 of FIGURE 2 represent those steps carried out under anhydrous conditions and are the steps included in block 14 of FIGURE 1.

In FIGURE 2, irradiated fuel is introduced to mechanical preparation step 16. Here the flow channels, lifting bales, nose pieces, and other non-fuel-containing removable parts of the fuel assembly are removed. If desired, mechanical disassembly of the fuel rod assembly such as by separating individual fuel rods may also be performed. In one preferred embodiment, the individual fuel rods are further chopped into short sections about one inch long. In another preferred embodiment of the invention the entire full length fuel rods are passed through a rolling and punching mechanism which perforates the clad and crushes to a slight extent the fuel contained within the fuel element. Both of these latter two operations are designed to increase the access of the dissolving acid to the fuel material.

The thus prepared fuel is introduced into fuel dissolution step 18. In this step the spent fuel is contacted with a strong mineral acid, such as nitric acid, to dissolve the fuel material, leaving the clad metal (such as zirconium or stainless steel) substantially unaffected. This treatment produces an aqueous acid solution of the uranium, plutonium, and fission product values which may be separated from undissolved clad material by decantation, filtration, or similar operations.

The irradiated fuel solution is introduced into the organic amine extraction step 20. This amine extraction step is carried out in extraction column 84, illustrated in FIGURE 3. In this step the spent fuel solution is contacted with a tertiary or quaternary amine salt solution in an inert organic diluent. The plutonium and a minor proportion (about 0.1%) of the fission product values are extracted into the amine solution while the uranium and substantially all (about 99.9%) of the fission product values pass through unaffected and appear as a plutonium-free first aqueous raffinate solution. This solution is treated further in step 24 subsequently described.

The plutonium and the minor proportion of fission products are recovered from the rich organic amine solvent as an aqueous extract phase which is then introduced into anion exchange step 22 in which the plutonium is retained by the ion exchange resin. The fission products pass through as a second aqueous raffinate and are recycled to fuel dissolution step 18. The loaded ion exchange resin is treated in step 22 with an eluting solution to recover the plutonium as an aqueous elution effluent solution containing a substantially pure fission product free plutonium nitrate as a process product.

The plutonium-free first aqueous raffinate solution, containing the uranium and fission product nitrates, produced from the organic amine extraction step 20 is introduced into dehydration-calcination step 24. Here the aqueous uranium and fission product solution is evaporated and residual solids are calcined to produce an anhydrous solid material comprising a plutonium-free mixture of uranium and fission product oxides. The evolved acids and acid anhydrides are recovered in acid recovery step 26 and are recirculated for reuse in the process. The anhydrous solids are discharged from step 24. This completes the operations in the aqueous part of the process of this invention illustrated by blocks 10 and 12 in FIGURE 1.

The calcined anhydrous solid material is introduced into fluorination step 28. Here the mixed oxides are directly fluorinated to convert them to volatile fluorides. The fluorination may be conducted in a single stage process using elemental fluorine as the fluorinating agent. Alternatively, it may be conducted in two stages, first using hydrogen fluoride as the fluorinating agent followed by elemental fluorine in the second stage to complete the fluorination. In either case, the fluorination step produces a partly volatile mixture of uranium and fission product fluorides.

The fluoride vapors thus produced are introduced into fluoride fractionation step 30. In a preferred embodiment of this invention, this step constitutes a fractional distillation of the fluoride vapors. The fractionation step 30 may utilize a distillation column provided with a sufficient number of trays to produce the required degrees of separation of fission product and uranium fluorides. Any trace quantities of other elements carried over from the anion exchange step are also separated from uranium in this fractionation step. Thus the uranium hexafluoride is separated in the absence of plutonium fluorides from fission product fluorides as process products.

EXAMPLE I

Referring now to FIGURE 3, a schematic flow diagram of one embodiment of the invention is shown. The description of FIGURE 3 will be conducted in the form of a specific example of the present invention applied to the reprocessing of irradiated $UO_2$ type power reactor fuel at the rate of 330 kg. of contained uranium per day which has been irradiated to approximately 10,000 mwd./t. (megawatt-days per ton) and has a plutonium concentration of about 0.5 percent by weight. The plutonium throughput is accordingly 1670 grams per day. Irradiated fuel is received in the form of assemblies approximately 10 feet long and 3.75 inches square. The assemblies consist of a 6 x 6 square array of fuel rods approximately 0.5 inch in diameter clad with a tube of zirconium alloy and originally containing $UO_2$ of 1.5% enrichment. These fuel assemblies also include a zirconium tube flow channel, a lifting bale, and a nose piece.

The irradiated fuel assemblies are introduced into mechanical preparation zone 50. Here the channels, lifting bales, and nose pieces are removed and the fuel rod bundle is chopped into pieces approximately one inch long. A charge of the thus treated fuel containing about 330 kg. of uranium is introduced in dissolving zone 52 for dissolution. The dissolving agent is strong nitric acid introduced through lines 54 and 58. This solution is recirculated by means of an air lift through dissolver 52 and lines 62 and 64. Air is introduced through line 66 controlled by valve 68. Upon dissolution of the fuel material from the zirconium clad tubes, the dissolved fuel solution is discharged through lines 70 and 72 by means of jet pump 74 into first run tank 76 at a rate controlled by valve 73 in steam inlet line 71. This dissolution step is controlled to produce a dissolved fuel solution which is at least 3 molar in nitric acid and preferably is between 0.5 and 0.75 molar in uranium at the end of a dissolving cycle. Undissolved zirconium clad metal held in a basket not shown is removed from dissolver 52 and discarded. Following removal of the dissolver solution a subsequent charge of irradiated fuel is introduced. The dissolver cycle is repeated and the irradiated fuel solutions thus produced are accumulated in first run tank 76. Several dissolver zones 52 may be operated simultaneously or in sequence. The irradiated fuel solutions so produced are periodically introduced through line 74 into one or more first run tanks 76 which serve as a reservoir for solution subsequently treated in the process.

First run tank 76 is provided with pump 78 by means of which the tank contents may be circulated through line 80 at a rate controlled by valve 82. Prior to treatment of the irradiated fuel solution in the organic amine extraction column 84, sodium nitrite solution or nitrogen dioxide is introduced in small quantities through line 86 controlled by valve 88 to stabilize the tetravalent state of the plutonium. Also, nitric acid may be introduced to the circulating stream through line 90 controlled by valve 92 to adjust the acidity of the fuel solution. For purposes of the following discussion, the solution volumes will be given in arbitrary units (AU) relative to an aqueous irradiated fuel solution of 100 AU fed to extraction column 84.

This irradiated fuel solution is pumped from first run tank 76 by means of pump 78 through line 94 at a rate controlled by valve 96 into liquid organic amine extraction column 84. This column is of known construction and may be provided with contacting trays or plates or solid packing to enhance liquid-liquid contact. Preferably columns of the perforated plate type provided with pneumatic pulser mechanisms are used since this type occupies the smallest volume for a given throughput. The fuel solution is countercurrently contacted with approximately 25 AU of a 0.15 to 0.3 molar solution of trilauryl amine (a tertiary amine nitrate) in a kerosene boiling range hydrocarbon in the lower portion (below the feed point) of column 84. The liquid amine solution is introduced through line 98 controlled by valve 100. The amine salt forms a complex with and extracts the tetravalent plutonium and a trace of fission products, and the resultant rich organic solvent flows upwardly into the upper part of column 84. The first aqueous raffinate containing the uranium fission products discharges through line 99 controlled by valve 101 and is treated as described below. In the upper part of column 84, the rich organic solvent is countercurrently scrubbed with approximately 20 AU of about 4 molar nitric acid introduced through line 102 controlled by valve 104. This scrubbing produces a scrubbed rich organic solvent which leaves column 84 via line 106, and is introduced into stripping column 85. Here the scrubbed rich organic solvent is countercurrently stripped with about 20 AU of an aqueous stripping solution, in this example about 1 molar in sulfamic acid and about 0.05 molar in ferrous iron as the sulfamate, introduced through line 87 controlled by valve 89. This treatment reduces the plutonium valence from 4 to 3 and causes its rejection from the organic to the aqueous phase, producing a stripped organic solvent phase and an aqueous plutonium extract. The fission products are partitioned between the aqueous extract and organic phase which are subsequently treated as described below to complete the required decontaminations. The stripped organic phase is removed through line 91 and the aqueous plutonium extract is removed through line 93 controlled by valve 95.

The stripped organic phase is introduced into organic wash tank 97 which comprises a mixer-settler. Dilute aqueous sodium carbonate solution is introduced through line 103 controlled by valve 105 in sufficient quantity to neutralize excess acid. The solutions are agitated and allowed to settle whereby residual fission products are separated from the stripped organic solvent which is pumped through line 109 by pump 110 back to extraction column 84 for reuse. The aqueous fission product waste stream is discharged through line 107 controlled by valve 108.

Second run tank 116 is provided with pump 118, recycle line 120, and valve 122. The aqueous plutonium extract produced from stripping column 85 is introduced via line 93 and circulated through second run tank 116 while sodium nitrite solution or nitrogen dioxide is introduced through line 124 controlled by valve 126 and nitric acid is introduced through line 132 controlled by valve 134. This treatment restores the plutonium to the tetravalent state and adjusts the nitric acid concentration in the range of about 6 to 8 molar. Valve 122 is then closed, valve 136 in line 138 is opened, and the thus treated aqueous plutonium extract is pumped through anion exchange column 140 in contact with a solid anion exchange resin bed. The plutonium is retained in the resin in exchange for nitrate ions, and an aqueous plutonium-free second raffinate is discharged through line 142 provided with valve 144 containing residual traces of fission products and strong nitric acid which is recirculated for reuse in dissolver 52. Anion exchange column 140 is about 6 inches in diameter, and contains a 120-inch-deep bed of an anion exchange resin of the strong base quaternary amine type. One suitable resin of this type is commercially available under the trade name "Permutit SK." Column 140 contains a total resin bed volume of 55.6 liters. The plutonium capacity of this resin is 70 grams per liter, giving total bed capacity of 3900 grams, well in excess of the daily flow rate of 1670 grams of plutonium.

The resin bed in column 140 is then washed with at least 45 AU of 6 to 8 molar nitric acid free of fission products introduced through line 146 controlled by valve 148, producing a wash effluent which is also returned to dissolver 52 through lines 142 and 54.

The wash flow is then terminated, valve 150 is opened, and the resin bed is contacted with approximately 10 AU of 0.3 to 0.8 molar nitric acid as eluant introduced through line 152. This produces an elution effluent, which is the plutonium product stream containing the 1670 grams of plutonium, and it flows from column 140 through line 154 controlled by valve 156. The plutonium concentration is about 10 grams per liter, and has a decontamination factor of between $10^7$ and $10^8$.

Returning now to the treatment of the mixture of uranium and fission products, the first aqueous raffinate is discharged from extraction column 84 as a solution containing about 120 grams of uranium per liter as uranium nitrate and substantially all (about 99.9%) of the fission products as nitrates. Its volume is 120 AU. The first aqueous raffinate is passed by means of line 99 into evaporator 160 where the solution is evaporated to form a concentrated solution of between about 60% and 100% uranium nitrate hexahydrate. The water and dilute nitric acid evolved are passed through lines 162 and 164 into nitric acid absorption column 166. The concentrated solution from evaporator 160 is passed through line 168 at a rate controlled by valve 170 into calciner 172. Here the concentrated solution is evaporated and heated to a temperature of about 300° C., which effectively calcines the residual solids to form an anhydrous mixture of uranium and fission product oxides which are removed from calciner 172 through line 176. Residual moisture, nitric acid, and mixed oxides of nitrogen are removed through line 174. These are combined with the evaporator effluent and are introduced to nitric acid absorption column 166 for recovery and reuse in the process. Some fission product ruthenium may also volatilize in this calcining step, and it is removed from the evolved gases by contact adsorption in zone 175.

The mixed oxides are introduced into fluorinator 178 provided with cooling means 179. In one embodiment of this invention the solids are here contacted first with hydrogen fluoride at temperatures within the range of from 250° C. to 350° C. This converts the uranium to uranium tetrafluoride, and converts at least part of the fission products also to fluorides. These materials are subsequently contacted by elemental fluorine at a temperature between about 300° C. and 600° C. to convert the uranium tetrafluoride to uranium hexafluoride. An alternative procedure may be substituted if desired and this involves the direct fluorination of the calcined solids with elemental fluorine in a single reaction step at temperatures between about 300° C. and about 600° C. The fluorination agent is introduced into fluorination zone 178 by means of line 180 controlled by valve 182. The fluorination steps may be conveniently accomplished by fluidized solids techniques.

Some, but not all, of the fission product fluorides are volatile under the fluorination zone conditions. Nonvolatile fluorides are withdrawn from fluorinator 178 through line 184 controlled by valve 186, and are passed through aftercooler 188.

The fluorination step product vapors, comprising uranium hexafluoride and volatile fission product fluorides are solidified in a cold trap not shown to permit separation of non-condensible gases. The solidified fluorides are subsequently vaporized and are passed by means of line 190 into first fractionation column 192 provided with overhead condenser 194 and bottom reboiler 196. The most volatile fission product fluorides, boiling below uranium hexafluoride, are removed as a first overhead product from column 192 through line 198 controlled by valve 200 while uranium hexafluoride and less volatile fission product fluorides are removed from the bottom of first column 192 through line 202 controlled by valve 204. This bottom stream is introduced into second fractionation column 206 provided with overhead condenser 208 and bottoms reboiler 210. The uranium hexafluoride is removed as an overhead product of the process from column 206 through line 202 controlled by valve 214. This product has a decontamination factor of between $10^8$ and $10^9$ relative to the dissolver effluent. The bottom product is removed through line 216 controlled by valve 218 and contains the higher boiling fission product fluorides.

As an alternative to fractional distillation of the volatile fluoride vapors as shown in FIGURE 3, column 192 may comprise a sorption column packed with a bed of solid granular alkali metal fluoride such as sodium fluoride. By contacting such a solid bed at about 200° C. with the mixed fluoride vapors, uranium hexafluoride is retained by the contact mass whereas the fission product fluorides pass through unaffected. The uranium hexafluoride is removed from the bed of solids by heating the solids to temperatures of about 400° C. to desorb the uranium hexafluoride thereby effecting the fractionation and uranium recovery.

The water vapor, nitric acid vapors, and mixed oxides of nitrogen evolved from the evaporator zone 160 and calciner 172, are passed into nitric acid absorption column 166 as described above. This column is provided with an overhead condenser 220 and a bottoms reboiler 222. Air or other oxidizing gas is introduced into the column 166 by means of line 224 at a rate controlled by valve 226. Dilute nitric acid is introduced into the top of column 166 by means of line 228 controlled by valve 230. In column 166, nitrogen dioxide ($NO_2$) and its dimer ($N_2O_4$) react with water to produce nitric acid ($HNO_3$) and nitric oxide (NO). The nitric oxide is oxidized with air to produce nitrogen dioxide ($NO_2$) for further reaction with water. From the top of column 166 through line 232, non-condensible gases (principally nitrogen) are removed and sent to a stack not shown. From the bottom of column 166 through line 223 is removed concentrated nitric acid at a rate controlled by valve 225. With column 166 operated at atmospheric pressure and having about 12 theoretical plates, the concentrated nitric acid produced is about 55 weight percent or about 11.5 molar. This concentration is entirely adequate for the process of this invention. This acid is recirculated through lines 90 and 58 for reuse in the process.

EXAMPLE II

A second embodiment of this invention is described below, and is a modification of the process described in connection with Example I and FIGURE 3. In this embodiment the liquid amine extractant is a solution of a quaternary organic amine in the nitrate form (sometimes called a quaternary organic ammonium nitrate) in a kerosene boiling range hydrocarbon. A suitable amine in the nitrate form has the following structural formula

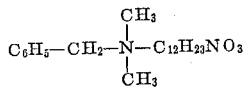

and may be prepared by reacting nitric acid with this amine in the chloride form, which is available commercially under the trade name "Vantoc CL." The concentration of amine in the organic solution may range from 0.05 to 0.3 molar. The organic solution may also contain a low concentration of normal octyl alcohol (2 to 10 volume percent) to prevent formation of a second organic phase. The amine extraction cycle is similar to those described in Example I except that a dilute nitric acid solution, from 0.01 to 0.1 molar in nitric acid, is used as the stripping solution in column 85 in place of the ferrous sulfamate solution. The same highly efficient separation efficiency is obtained.

In Example I the tertiary organic amine solution discussed was trilauryl amine in a kerosene boiling range hydrocarbon. It should be understood that other tertiary amines having carbon-to-nitrogen atom ratios of at least about 18:1 may be substituted. With ratios lower than about 18:1 the amine nitrates tend to become soluble in nitric acid solutions and there is a tendency toward double organic phase formation. Further, a wide variety of organic diluents may be employed such as xylene, carbon tetrachloride or nitromethane. The organic extractant solution may also contain a low concentration of normal octyl alcohol (2 to 10 volume percent) to reduce the tendency toward formation of a second organic phase. Specific examples of such tertiary organic amine solutions are discussed in Proceedings, Second International Conference on Peaceful Uses of Atomic Energy (1958), P/544, volume 17, p. 348, "Tertiary Amine Extraction of Plutonium From Nitric Acid Solutions," by A. S. Wilson.

Further in Example I the reducing stripping solution used in column 85 was an aqueous solution of about 1 molar sulfamic acid approximately 0.05 molar in ferrous sulfamate. It should be understood that other aqueous solutions may be employed which will strip the plutonium from the tertiary amine extractant either by complex formation or by reducing the plutonium from the tetravalent to the trivalent state. A suitable alternate stripping solution employing complex formation is 0.1 molar oxalic acid in water. Other suitable reducing stripping solutions are 0.05 molar hydroxylamine sulfate or 0.02 molar hydrazine in dilute nitric acid. The primary requirements of such reducing solutions are that they be capable of reducing plutonium from the tetravalent to the trivalent state and that they be stable in aqueous solutions containing nitrate and nitrite ions.

In Example II a specific quaternary organic amine is named. It should be understood that other quaternary organic amines, having carbon to nitrogen atom ratios of at least 15:1 and preferably containing at least one alkyl chain having a minimum of 10 carbon atoms, may be employed.

Specific examples of suitable quaternary amine solutions are discussed at pages 145–151 of the "First Eurochemic Activity Report" 1959–1961, published by the Organization for Economic Cooperation and Development, European Nuclear Energy Association, Paris, France.

In the examples discussed above the treatment of the recycled organic solution consisted of scrubbing with a dilute aqueous solution of sodium carbonate to remove acid and fission products. It should be understood that additional treatments may be employed to enhance the removal of specific fission products. Such a treatment may include washing the organic solution with a dilute alkaline aqueous solution of potassium permanganate to improve the removal of ruthenium.

In the examples above, the anion exchange resin specified was Permutit SK. It should be understood that this is not a limitation of this invention, but is merely illustrative of a general class of exchange resins operable in the process of this invention and which are of the strong base quaternary amine type. Other specific examples of such resins are discussed at considerable length in Proceedings, Second International Conference on Peaceful Uses of Atomic Energy (1958), volume 17, page 137, "Application of Anion Exchange to the Reprocessing of Plutonium," by J. L. Ryan and E. J. Wheelwright.

Although the foregoing examples have dealt with reprocessing of $UO_2$, it should be understood that the process of this invention is not so limited. The process is applicable to reprocessing of any fuel material, whether it be in elemental form (uranium or plutonium metal or nitric acid soluble alloys thereof) or in compound form such as the oxides, carbides, nitrides, silicides, and other refractory compounds of such metals. The only requirement is that the fuel material be dissolved in an appropriate solvent such as strong nitric acid, for example.

Several particular embodiments of this invention have been described in considerable detail by way of illustration. It should be understood that various other modifications and adaptations thereof may be made by those skilled in that particular art without departing from the spirit and scope of this invention as defined in the following claims.

We claim:
1. A method for treating an aqueous solution of irradiated nuclear reactor fuel which comprises:
   (A) Subjecting said solution to a single cycle extraction with an organic solvent comprising an organic amine salt selected from the class consisting of tertiary and quaternary amine salts dissolved in an inert organic diluent to produce an organic extract stream containing substantially all of the plutonium in tetravalent form and an aqueous raffinate containing substantially all of the uranium and fission products;
   (B) Stripping said organic extract with an aqueous stripping agent to reduce plutonium to trivalent form and remove substantially all of said plutonium and trace of fission products as an aqueous extract;
   (C) Dehydrating said aqueous raffinate stream to form substantially plutonium-free anhydrous solids,
      (1) Fluorinating said solids by reaction with elemental fluorine to form the corresponding fluorides, and

(2) Separating the uranium fluoride in the absence of plutonium fluorides from the fission product fluorides.

2. A method for treating an aqueous solution of irradiated nuclear reactor fuel which comprises:
(A) Extracting said solution with an organic solvent comprising an amine salt selected from the class consisting of tertiary amine salts having carbon to nitrogen atom ratios of at least about 18:1 and quaternary amine salts having carbon to nitrogen atom ratios of at least about 15:1 dissolved in an inert organic diluent in the presence of first aqueous salting agent to produce,
   (1) An aqueous raffinate stream containing substantially all of the uranium and fission products and
   (2) An organic extract stream containing substantially all of the tetravalent plutonium and a trace of fission products;
(B) Stripping said organic extract with an aqueous stripping agent to reduce said plutonium to trivalent form and remove substantially all of said pultonium and trace of fission products as an aqueous extract,
   (1) Reoxidizing the plutonium in said aqueous extract to the tetravalent state,
   (2) Contacting said aqueous extract with an anion exchange resin to retain plutonium, and
   (3) Eluting said plutonium as a product stream from said ion exchange resin;
(C) Dehydrating said aqueous raffinate stream to form anhydrous solid, uranium and fission product oxides,
   (1) Fluorinating said oxides by reaction with elemental fluorine to convert said uranium and fission products to the corresponding fluorides, and
   (2) Fractionating the relatively high boiling fission product fluorides in the absence of plutonium fluorides from the relatively low boiling uranium fluoride.

3. A method according to claim 2 in combination with the step of producing said aqueous solution of irradiated nuclear fuel by dissolving such fuel in a strong mineral acid.

4. A method according to claim 2 in combination with the step of maintaining the acidity of said aqueous solution of irradiated nuclear reactor fuel at a value of about 3 molar in hydrogen ion during contact with said organic solvent.

5. A method according to claim 2 wherein said organic solvent comprises a tertiary organic amine salt and the aqueous stripping agent reduces plutonium from the tetravalent to the trivalent state whereby it is rejected from the organic extract into the aqueous extract phase.

6. A method according to claim 2 wherein said organic solvent comprises a tertiary organic amine salt and the aqueous stripping agent comprises oxalic acid forming a complex with the plutonium to remove it from the organic extract into the aqueous extract phase.

7. A method for separating fission products from the plutonium-uranium values in an aqueous nitric acid solution of irradiated nuclear reactor fuel which comprises the steps of:
(A) Maintaining said solution at least 3 molar in nitric acid and contacting said solution with an organic solvent comprising a hydrocarbon solution containing between about 0.15 and about 0.30 mol per liter of the nitrate salt of an organic amine selected from the class of (a) tertiary amines having carbon to nitrogen atom ratios of at least 18:1 and (b) quaternary amines having carbon to nitrogen atom ratios of at least about 15:1 and at least one alkyl chain having at least 10 carbon atoms to form;
   (1) A rich organic solvent containing plutonium and a trace of fission products, and
   (2) A substantially plutonium-free aqueous raffinate containing uranium and substantially all fission products;
(B) Stripping said organic extract under conditions which reduce the plutonium to the trivalent state and separating said plutonium and trace of fission products as an aqueous extract,
   (1) Treating said aqueous extract to convert the plutonium to the tetravalent state and to adjust the extract to between about 6 and about 8 molar in nitric acid,
   (2) Contacting the thus treated aqueous extract with an anion exchange resin to retain plutonium on said resin, and
   (3) Eluting said plutonium as a product stream from said resin by contact with 0.3 molar to 0.8 molar nitric acid;
(C) Dehydrating said plutonium-free aqueous raffinate by evaporation and calcination to produce anhydrous mixed oxides of said uranium and fission products,
   (1) Fluorinating said anhydrous mixed oxides to produce the corresponding fluorides, and
   (2) Fractionating the substantially plutonium-free fluoride mixture so produced to separate the fission product fluorides substantially completely from the uranium hexafluoride to produce an accepted decontaminated uranium product.

8. A method according to claim 7 wherein said organic solvent comprises a tertiary organic amine salt and the aqueous stripping agent reduces plutonium from the tetravalent to the trivalent state whereby it is rejected from the organic extract into the aqueous extract phase.

9. A method according to claim 7 wherein said organic solvent comprises a tertiary organic amine salt and the aqueous stripping agent comprises oxalic acid forming a complex with the plutonium to remove it from the organic extract into the aqueous extract phase.

10. A method according to claim 7 wherein the fractionation of the fluoride mixture is accomplished by fractional distillation.

11. A method according to claim 7 in combination with the step of washing said anion exchange resin with nitric acid of about 7 molar immediately prior to contacting said resin with said nitric acid elution solution.

References Cited

UNITED STATES PATENTS

| | | | |
|---|---|---|---|
| 2,837,401 | 6/1958 | Schubert | 23—338 |
| 3,046,089 | 7/1962 | Steindler | 23—326 |
| 3,154,377 | 10/1964 | Chesne | 23—340 |
| 3,222,124 | 12/1965 | Anderson et al. | 23—326 |

CARL D. QUARFORTH, *Primary Examiner.*

L. DEWAYNE RUTLEDGE, *Examiner.*

S. TRAUB, R. L. GRUDZIECKI,
*Assistant Examiners.*

UNITED STATES PATENT OFFICE

CERTIFICATE OF CORRECTION

Patent No. 3,359,078                                  December 19, 1967

Henry Ward Alter et al.

It is certified that error appears in the above identified patent and that said Letters Patent are hereby corrected as shown below:

Column 2, line 43, "requies" should read -- requires --. Column 8, line 66, "uranium fission" should read -- uranium and fission --. Column 13, line 62, "at least 3 molar" should read -- at least about 3 molar --.

Signed and sealed this 12th day of August 1969.

(SEAL)
Attest:

Edward M. Fletcher, Jr.                            WILLIAM E. SCHUYLER, JR.
Attesting Officer                                             Commissioner of Patents